S. BUDLONG & W. O. TALCOTT.
Belt-Fastener.

No. 205,610. Patented July 2, 1878.

UNITED STATES PATENT OFFICE.

SIMEON BUDLONG AND WALTER O. TALCOTT, OF PROVIDENCE, R. I.

IMPROVEMENT IN BELT-FASTENERS.

Specification forming part of Letters Patent No. 205,610, dated July 2, 1878; application filed May 3, 1878.

*To all whom it may concern:*

Be it known that we, SIMEON BUDLONG and WALTER O. TALCOTT, both of the city and county of Providence, in the State of Rhode Island, have invented certain new and useful Improvements in Belt-Fasteners; and we do hereby declare that the following specification, taken in connection with the drawings furnished and forming a part thereof, is a clear, true, and complete description of our invention.

The object of our invention is to attain in metallic belt-fasteners a capacity for ready insertion and such an engagement with the belt as will preclude the possibility of disconnection.

Our invention relates to that class of fasteners which are composed of a plate and teeth, which are driven into the belt.

Heretofore such fasteners have been secured against displacement by clinching or bending the teeth on the pulley side of the belt.

Our invention consists in a belt-fastener composed of a plate and barbed-pointed penetrating-teeth, which are easily driven into a belt, but prevented from retraction by the barbs. The form of the teeth may be largely varied; but for good service the barbs should project laterally on one or both sides of each tooth.

To more particularly describe our invention, we will refer to the accompanying drawings, in which—

Figure 1:
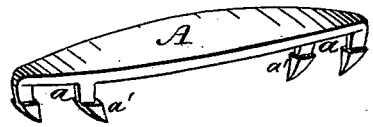
Figure 2:
Figure 3:
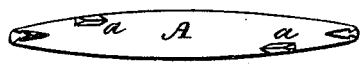

Figure 1 represents, in perspective, one of our barbed-tooth belt-fasteners. Fig. 2 represents the same in cross-section in line with the middle of one of its teeth. Fig. 3 represents the under side of the fastener.

A denotes the plate, which may be made of any desired size, according to the character of the belt with which its use is intended. Sometimes we have a wide plate for a wide belt, and at other times several narrow plate-fasteners are used, side by side, but separated by distances of from one-quarter of an inch upward. The plates may be made of cast or wrought metal, and they are rounded on their upper surfaces from end to end, and also laterally, as shown. The corners at the ends are also rounded, so as to obviate the liability of catching or engaging with objects accidentally in contact with the belt while in motion. The teeth $a$ are sometimes cast with the plate, and sometimes they are made separately and inserted into holes drilled in the plate, and secured therein with solder. We prefer that the teeth be slightly hook-shaped, as shown.

The barbs $a'$ may be made in various forms; but we prefer that the shoulder thereof be nearly rectangular to the shank of the tooth, and that the points in lateral section should be arrow-shaped, as shown in Fig. 2. The plates may be provided with any desired number of teeth; but it is desirable that they should be placed in different lines longitudinally, so as to distribute the strain at different lateral points on the belt.

Our barbed-tooth belt-fasteners are adapted for use with belts of all kinds, whether light or heavy, narrow or wide, single or double. When intended for use with double belts the distance between the plate and the shoulders of the barb should be sufficiently greater than the thickness of the outer layer of the belt to allow the shoulders of the barb to be well embedded in the lower layer, and thereby to firmly bind the two layers together. In no case should the points of the teeth extend through the belt.

Having thus described our invention, we claim as new and desire to secure by Letters Patent—

A belt-fastener composed of a plate and barbed penetrating points or hooks, substantially as described.

SIMEON BUDLONG.
    WALTER ORLANDO TALCOTT.

Witnesses to signature of Simeon Budlong:
    JOHN C. PURKIS,
    GILMAN E. JOPP.

Witnesses to signature of Walter O. Talcott:
    THO. L. FORREST,
    C. W. KIMBALL.